United States Patent [19]

Arnold

[11] Patent Number: 5,148,928
[45] Date of Patent: Sep. 22, 1992

[54] SHELF SYSTEM
[75] Inventor: William D. Arnold, St. Louis, Mo.
[73] Assignee: Lee-Rowan Company, St. Louis, Mo.
[21] Appl. No.: 444,531
[22] Filed: Dec. 1, 1989
[51] Int. Cl.[5] ............................................. A47B 43/00
[52] U.S. Cl. .................................... 211/187; 211/153
[58] Field of Search ............... 211/186, 187, 181, 153; 248/249

[56] References Cited

U.S. PATENT DOCUMENTS

| | | | |
|---|---|---|---|
| 2,599,607 | 6/1952 | Burrise | 211/153 |
| 3,132,609 | 5/1964 | Chesley | 211/181 X |
| 3,554,383 | 1/1971 | Ball | 211/153 |
| 3,589,746 | 6/1971 | Inglis et al. | 211/187 X |
| 3,637,183 | 1/1972 | Sagers | 211/186 X |
| 3,730,108 | 5/1973 | Stroh | 211/181 X |
| 4,603,781 | 8/1986 | Ryan, Jr. | 211/153 X |
| 4,732,358 | 3/1988 | Hughes et al. | 211/153 X |
| 4,735,325 | 4/1988 | Remmers | 211/187 |
| 4,750,626 | 6/1988 | Nicely | 211/187 |

Primary Examiner—Alvin C. Chin-Shue
Assistant Examiner—Sarah A. Lechols
Attorney, Agent, or Firm—Rogers, Howell & Haferkamp

[57] ABSTRACT

A shelf system having a wire shelf and end brackets. Snap mechanism in the form of hooks latch the transverse rods of the shelf to the end brackets.

9 Claims, 1 Drawing Sheet

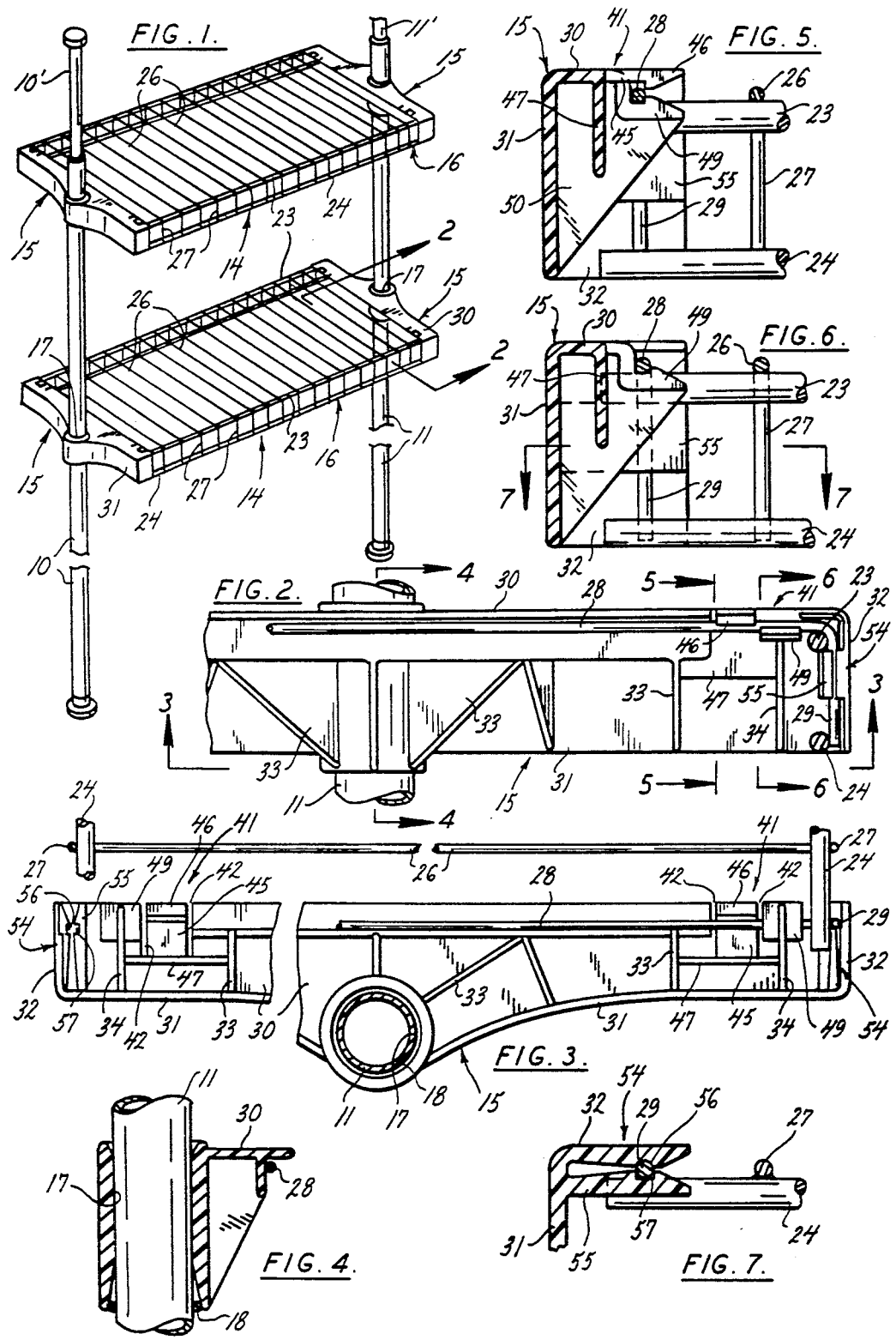

5,148,928

SHELF SYSTEM

BACKGROUND OF THE INVENTION

This invention relates to a shelf system of the kind having shelves mounted on poles, and more particularly relates to an end bracket for supporting the end of a shelf on a pole.

Many different arrangements have been provide for shelving. Some have existed with the ability to assemble the shelving. Many times tools are required, such as screwdrivers or monkey wrenches. There are other arrangements wherein parts were fitted together without tooling being required, but lacked stability and security, or have been very difficult to assemble.

SUMMARY OF THE INVENTION

The present invention overcomes many of the foregoing problems. It is easily assembled without the use of tools. On the other hand, it is very secure and stable after it is assembled and can take substantial loads. It has snap-in arrangements for holding the shelf parts into the end brackets. These snap-in arrangements are designed to prevent accidental withdrawal of the shelving parts from the end brackets, and are also designed to hold the shelving parts stable in the end brackets without being pivotable or swingable or otherwise loose therein. They do permit disconnecting if desired.

Finally, the arrangement is such that shelves can be reduced in size to the desired length very easily and still be interengageable with the end brackets.

DESCRIPTION OF THE DRAWINGS

FIG. 1 is an isometric view of an assembly of the shelves of the present invention;

FIG. 2 is a section on the line 2—2 of FIG. 1;

FIG. 3 is a bottom view taken along the line 3—3 of FIG. 2 of one end of the assembly, partly broken away;

FIG. 4 is a view showing the vertically adjustable mount of the shelving on the posts, taken along the line 4—4 of FIG. 2;

FIG. 5 is a vertical view taken on the line 5—5 of FIG. 2;

FIG. 6 is a similar vertical view taken along the line 6—6 of FIG. 2; and

FIG. 7 is a horizontal section taken on the line 7—7 of FIG. 6.

DETAILED DESCRIPTION OF THE PREFERRED EMBODIMENT

The shelf arrangement here includes two posts or poles 10 and 11. They are illustrated as having spring-loaded extensions 10' and 11' by which they may be extended. By this arrangement, the poles may be compressed between the floor and the ceiling so as to be secure and stable. There may be rubber ends or pads on the ends of the two poles. This arrangement is not new.

Each of the shelf assemblies, generally designated 14, comprises two identical end brackets 15, and a load bearing wire shelf 16. These shelf assemblies 14 are adjustable vertically along the poles 10 and 11, each end bracket 15 having a tapered socket 17 (FIG. 4) that may be tapered toward the bottom so as to engage an O-ring 18 and wedge onto it. By this O-ring arrangement, not per se a part of the present invention, the shelve assemblies can be adjusted along the poles 10 and 11 to a choice of positions made by adjusting the O-rings 18.

Each of the shelf end brackets 15 is designed to receive one end of a shelf 16. Each shelf 16 comprises vertically spaced, longitudinal horizontal rods 23 and 24 at each side that are joined by a plurality of transverse horizontal rods 26 that span across the shelf and have downturned ends 27. As shown in FIG. 2, the horizontal rods 26 located at the outer most ends of the shelf 16, as indicated by 28, also have downturned ends 29. These transverse rods 26, 28, as well as the longitudinal rods 23 and 24, typically are of metal. Thus, the shelf assembly 14 comprises two end brackets 15 joined by longitudinal rods 23 and 24 at each side, said longitudinal rods being joined by the transverse horizontal rods 26, 28, the end rods 28 being mounted in the end brackets 15 as will be described. The opposite ends of the load bearing shelves 16 are releasably latched into the end brackets 15 in a manner to be described.

Each end bracket 15 has an upper horizontal panel 30 around which is joined a vertical wall 31 that extends from side to side of the shelf and terminates in ends 32. As seen from FIG. 3, the downturned wall 31 curves outwardly to go around and be secured to the post sockets 17. Reinforcing panels, such as panels 33 and 34, reinforce and keep the end brackets rigid.

It can be seen that at each end of the shelf there ar two projecting ends of the longitudinal rods 23 and 24 joined by an end horizontal cross rod 28. The latching means will now be described, by which each of the two end brackets is secured to the shelf.

The first snap arrangement 41 for retaining the shelf 14 into the shelf end brackets 15 is at the top of the end bracket (FIG. 5). The top wall 30 has cuts 42 (FIG. 3) extending inwardly to free a flexible end 45 that has a sloping hook 46. The flexible end 45 is integral with the top 30 of the end bracket. It is backed by an integral molded panel 47 extending between two of the integral reinforcing panels 33 and 34 that are molded with the end bracket 15. Adjacent the panel 47 and the hook 46 there is a lower hook member 49 that projects outwardly and downwardly from the wall 30. The lower hook members has a sloping notched end that can engage below the cross member 26. It is braced by the integral panel 34 so it is rigid. Thus, from FIGS. 5 and 6, it is evident that the catch 41 operates when the transverse cross rod 26 is snapped into engagement under the spring latch 46 and above the latch 9, so that the shelf will be held in position wherein it cannot be withdrawn from the end bracket 15 or 16.

An additional snap arrangement 54 is provided to latch the downturned ends 29 of the end rods is 28 to prevent rocking movement of the shelves. For this purpose, each rigid end member 32 of the wall 31 cooperates with a similar but resilient projection 55 from the wall 31, both of which are oppositely notched as at 56 and 57, with sloping entrance members to receive the downturned ends 29 of the end shelf rods 28. The arrangement is such that the engagement of the downturned ends 29 within the notches 56 and 57 occurs at about the same time that the horizontal portion of the bar 28 is received within the members 46 and 49. As shown in FIG. 2, the rod 28 and rod ends 29 are confined within the snap arrangements 41 and 54 at right angles to one another, thus increasing stability of the shelf mounting.

IN USE

The shelf system provides a stable and readily assembled combination. Also, as noted, the shelf system can be used in a manner to enable the shelves to be made of different lengths. For example, if the shelves in FIG. 1 were too long from pole to pole, they would be cut down as far as one wishes, by cutting the rods 23 and 24, and leaving a different cross member 28 at the end of the members 23 and 24.

Then the shelf may be slipped into position within the horizontal snaps 41 and the vertical snaps 54. The rigid members of the snaps, such as the latches 49, add stability to the arrangement. The operation is simple but provides for a secure mounting of the shelves. Yet the shelf portion can be removed if needed. Also, the arrangement prevents uneven loads on a shelf portion from tilting it.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A shelving system capable of being completely assembled without the use of tools, the system comprising:
   a shelf member having first and second ends and including a horizontal shelf position and at least one extending vertical portion;
   at least one end bracket adapted to be secured to one of the first and second ends of the shelf member and provide support for the shelf member;
   means for connecting the end bracket and the shelf member, the means being adapted to connect the end bracket on the one end of the shelf member by pressing the end bracket on the one end of the shelf member, and the means being adapted to restrain withdrawal of the shelf member from connection with the end bracket and restrain pivoting movement of the shelf member relative to the end bracket;
   the means for connecting the end bracket and the shelf member includes a first flexible latch member secured to the end bracket and a second rigid latch member secured to the end bracket, the first and second latch member being vertically spaced from each other and arranged to engage on opposite sides of the horizontal shelf portion of the shelf member to connect the end bracket with the shelf member;
   and the means for connecting the end bracket and the shelf member includes a third flexible latch member secured to the end bracket and a fourth rigid latch member secured to the end bracket, the third and fourth latch members being horizontally spaced from each other and arranged to engage on opposite sides of the extending, vertical portion of the shelf member to connect the end bracket with the shelf member.

2. The shelving system of claim 1, wherein:
the means for connecting the end bracket and the shelf member is adapted to connect the end bracket on the one of the shelf member solely by pressing the end bracket to the one end of the shelf member.

3. The shelving system of claim 1, wherein:
the means for connecting the end bracket and the shelf member is formed integrally with the end bracket.

4. The shelving system of claim 1, wherein:
the means for connecting the end bracket and the shelf member is adapted to prevent vertical movement of the shelf member relative to the end bracket.

5. The shelving system of claim 1, wherein:
the first, second, third and fourth latch members are formed integrally with the end bracket.

6. The shelving system of claim 1, wherein:
the end bracket includes a vertical side wall and the means for connecting the end bracket and the shelf member includes a vertical notch formed in the vertical side wall, the vertical notch being adapted to receive the one end of the shelf member therein.

7. The shelving system of claim 1, wherein:
the shelf member is comprised of a plurality of rods joined together in spaced relation with one rod of the plurality of rods being arranged at the one end of the shelf member to engage with the first, second, third and fourth latch members and connect the end bracket with the shelf member.

8. The shelving system of claim 7, comprising:
the shelf member is further comprises of means rigidly joining the plurality of rods together in spaced relation, the means rigidly joining the rods being severable to reduce the size of the shelf member and expose another rod of the plurality of rods at the one end of the shelf member to connect with the first, second, third and fourth latch members.

9. The shelving system of claim 1, wherein:
the end bracket is adapted to be adjustably secured to a vertical post and support the shelf member in vertically adjusted positions on the post.

* * * * *